(12) United States Patent
Durocher et al.

(10) Patent No.: US 7,805,925 B2
(45) Date of Patent: Oct. 5, 2010

(54) GAS TURBINE ENGINE EXHAUST DUCT VENTILATION

(75) Inventors: Eric Durocher, Vercheres (CA); Eugene Gekht, Brossard (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1000 days.

(21) Appl. No.: 11/465,670

(22) Filed: Aug. 18, 2006

(65) Prior Publication Data

US 2008/0041033 A1    Feb. 21, 2008

(51) Int. Cl.
*F02K 3/04* (2006.01)
(52) U.S. Cl. .................. 60/264; 60/262; 239/265.25
(58) Field of Classification Search ............. 60/39.5, 60/226.1, 262, 264, 770; 239/265.25, 265.27
See application file for complete search history.

(56) References Cited

U.S. PATENT DOCUMENTS

| | | | | |
|---|---|---|---|---|
| 2,934,891 | A * | 5/1960 | Brown | 60/761 |
| 3,262,264 | A * | 7/1966 | O'Neill et al. | 239/265.19 |
| 3,390,837 | A | 7/1968 | Freeman | |
| 3,910,375 | A | 10/1975 | Hache et al | |
| 3,938,742 | A | 2/1976 | Corson, Jr. | |
| 3,970,252 | A | 7/1976 | Smale et al. | |
| 3,981,143 | A * | 9/1976 | Ross et al. | 60/264 |
| 4,044,555 | A * | 8/1977 | McLoughlin et al. | 60/264 |
| 4,085,585 | A * | 4/1978 | Sharpe | 60/262 |
| 4,109,864 | A | 8/1978 | Clayton | |
| 4,196,856 | A * | 4/1980 | James | 239/265.39 |
| 4,214,441 | A | 7/1980 | Mouritsen et al. | |
| 4,226,297 | A | 10/1980 | Cicon | |
| 4,240,519 | A * | 12/1980 | Wynosky | 181/213 |
| 4,355,507 | A * | 10/1982 | Coffey et al. | 60/39.5 |
| 4,577,462 | A | 3/1986 | Robertson | |
| 4,720,901 | A * | 1/1988 | Johnson et al. | 29/890.01 |
| 5,941,065 | A | 8/1999 | Lidstone et al. | |
| 6,012,281 | A * | 1/2000 | Hauser | 60/204 |
| 6,178,740 | B1 | 1/2001 | Su et al. | |
| 6,253,540 | B1 | 7/2001 | Chew et al. | |
| 6,502,383 | B1 | 1/2003 | Janardan et al. | |
| 6,505,706 | B2 | 1/2003 | Tse | |
| 6,584,766 | B1 | 7/2003 | Czachor | |
| 7,032,387 | B2 | 4/2006 | Germain et al. | |
| 7,043,898 | B2 * | 5/2006 | Rago | 60/262 |
| 7,216,475 | B2 * | 5/2007 | Johnson | 60/226.1 |
| 2003/0150214 | A1 * | 8/2003 | Lair | 60/771 |
| 2005/0109012 | A1 | 5/2005 | Johnson | |
| 2005/0155341 | A1 | 7/2005 | Germain et al. | |
| 2007/0015395 | A1 * | 1/2007 | Lefebvre et al. | 439/404 |
| 2007/0186535 | A1 * | 8/2007 | Powell et al. | 60/226.1 |

OTHER PUBLICATIONS

European Search Report of EP Patent Application No. 07 25 3253.

* cited by examiner

*Primary Examiner*—Michael Cuff
*Assistant Examiner*—Phutthiwat Wongwian
(74) *Attorney, Agent, or Firm*—Ogilvy Renault LLP

(57) ABSTRACT

A centerbody for the exhaust system of a gas turbine engine having an upstream end mounted within an exhaust duct casing of the exhaust system. The centerbody includes a plurality of ventilation openings defined in a centerbody wall which provide fluid flow communication between an internal cavity and exhaust gas flow surrounding the centerbody, such that ventilating air from within the cavity can exit into the exhaust gas flow.

19 Claims, 4 Drawing Sheets

US 7,805,925 B2

GAS TURBINE ENGINE EXHAUST DUCT VENTILATION

TECHNICAL FIELD

The present invention relates to gas turbine engines, and most particularly to exhaust ducts of such engines.

BACKGROUND OF THE INVENTION

Exhaust nozzles of gas turbine engines generally comprise an exhaust centerbody centered therewithin in order to obtain an annular outlet for the flow of exhaust gas around this axisymmetric (i.e. relative to the main engine axis) centerbody. A minimal amount of ventilation inside the centerbody is required in order to comply with engine certification requirements for cooling the bearing housing and pressurizing to reduce the potential for oil leakage from equipment therein, since the cavity formed by the centerbody and the turbine section is a designated potential fire zone. While various ways of providing ventilation to the exhaust centerbody have been attempted, there remains a need for improved exhaust centerbody ventilation without significantly impeding engine performance and without requiring complex, and therefore expensive to produce, structures.

SUMMARY OF THE INVENTION

Therefore, in accordance with one aspect of the present invention, there is provided an exhaust centerbody of a gas turbine engine disposed within an exhaust duct casing, exhaust gas flow passing through an annular exhaust duct passage defined between the exhaust centerbody and the surrounding exhaust duct casing, the exhaust centerbody comprising: a forward portion defining an outer wall over which exhaust gas flows and having an annular flange at a downstream end thereof, the radial flange including a first wall portion and a second wall portion downstream of the first wall portion, the second wall portion being substantially parallel to a central axis of the centerbody and the first wall portion being disposed between the outer wall and the second wall portion at an angle relative to said second wall portion; a tailcone portion having second outer surface, the tailcone portion having a closed downstream end and an open upstream end, said open upstream end of the tailcone portion being mated to the second wall portion of the forward portion about the circumference of the annular flange thereof; a centerbody cavity defined by the first and second inner surfaces and by the closed end; and a plurality of ventilation openings defined in said first wall portion of the forward portion, said ventilation openings providing fluid flow communication between the centerbody cavity and the exhaust gas flow, thereby ventilating the centerbody cavity.

Also in accordance with another aspect of the present invention, there is provided a centerbody for the exhaust system of a gas turbine engine, the centerbody having a central longitudinal axis coincident with that of the gas turbine engine, the centerbody comprising: an upstream end mounted within an exhaust duct casing of the exhaust system, a closed downstream end, and an annular centerbody wall extending between the upstream and downstream ends, a cavity defined within the centerbody and being in communication with a source of ventilation airflow; and a plurality of ventilation openings defined in said centerbody wall, said ventilation openings providing fluid flow communication between the cavity and exhaust gas flow of the gas turbine engine, such that ventilating air from within the cavity can exit into the exhaust gas flow, said plurality of ventilation openings being circumferentially disposed about the centerbody wall within an annular flange wall thereof, said annular flange wall being located between said upstream end and said closed downstream end and disposed at an obtuse angle relative to the central longitudinal axis of the centerbody.

There is further provided, in accordance with another aspect of the present invention, a ventilation system for a exhaust centerbody of a gas turbine engine, the centerbody defining a cavity therein and having a closed downstream end, the ventilation system comprising: a series of support struts radially extending from an upstream portion of the centerbody and locating said centerbody within a surrounding exhaust duct casing of the gas turbine engine, the support struts being hollow and each defining an inlet airflow passage therethrough, each said inlet airflow passage providing airflow from a source of ventilation air into the cavity; and a plurality of ventilation openings defined in a side wall of the centerbody downstream of said support struts, said ventilation openings providing airflow communication between the cavity and exhaust gas flow of the gas turbine engine outside of the centerbody, such that ventilation air from within the cavity exits into said exhaust gas flow through said ventilation openings.

BRIEF DESCRIPTION OF THE DRAWINGS

Having thus generally described the nature of the invention, reference will now be made to the accompanying drawings, showing by way of illustration a preferred embodiment thereof and in which.

DETAILED DESCRIPTION OF THE PREFERRED EMBODIMENT

Figure 1:
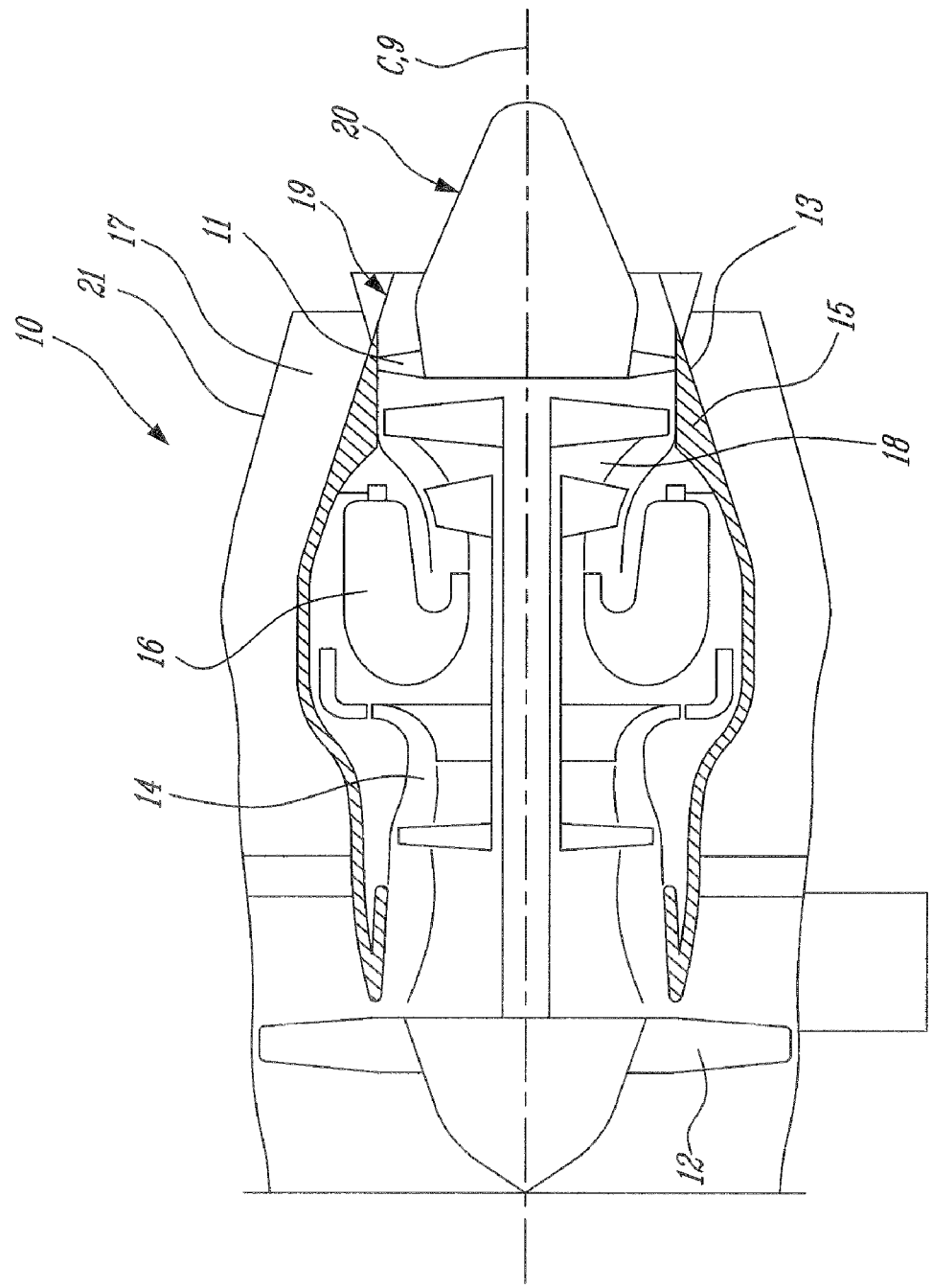
FIG. 1 is a side view of a gas turbine engine, in partial cross-section.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The hot combustion gases are exhausted through a nozzle/mixer 19 to produce thrust. The nozzle 19 includes an exhaust centerbody 20 centered therewithin by a plurality of hollow struts 11 to form an annular exhaust port defined within the surrounding enclosure 13. The enclosure also surrounds the turbine section 18 and defines an annular cavity 15 therein. A bypass air passage 17 is defined between the exhaust duct casing 13 and an engine outer casing 21. The exhaust centerbody has a central longitudinal axis 9 about which it is substantially symmetric, the axis 9 being coincident with a central longitudinally extending engine centerline C.

Figure 2:
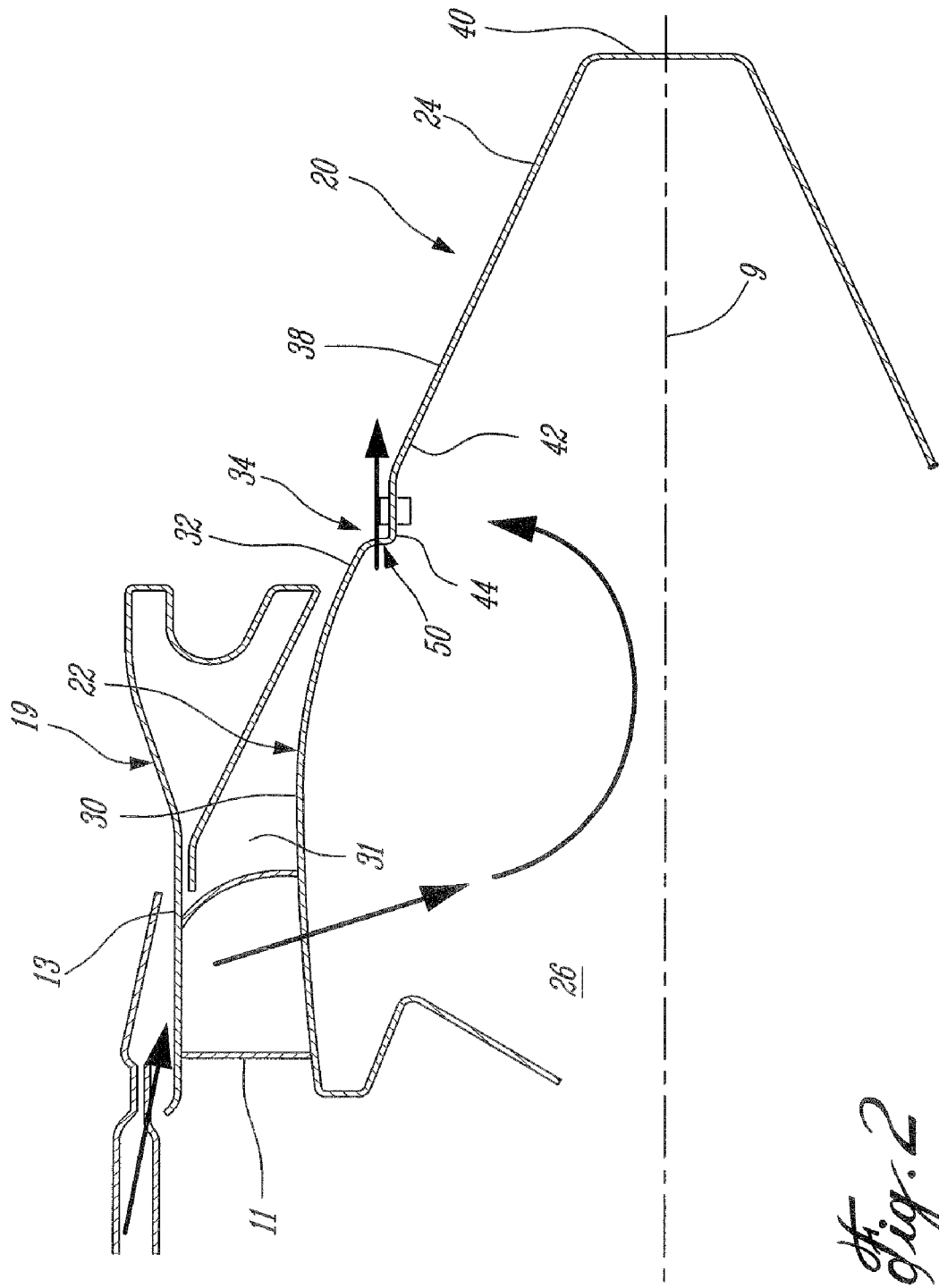
FIG. 2 is a side view of an exhaust duct and centerbody, in cross-section, in accordance with an aspect of the present invention.

Referring now to FIG. 2, the exhaust centerbody 20 comprises a first or forward portion 22 and a second or tailcone portion 24 which are serially connected together to form the somewhat frusto-conical shape of the exhaust centerbody 20. The forward portion 22 is hollow and comprises an annular outer wall 30 over and about which exhaust gas flows within the annular exhaust duct passage 31, the exhaust duct passage 31 being defined radially between the outer wall 30 of the centerbody 20 and the surrounding exhaust duct casing 13. The forward portion 22 includes a downstream end 32 having an annular flange 34, as will be described in further detail below. The tailcone portion 24 of the centerbody 20 is engaged to the downstream end 32 of the forward portion, so that the outer walls 30,38 form a continuous profile of the centerbody 20 within which a centerbody cavity 26 is defined. The tailcone portion 24 is also hollow and comprises an outer surface 38, a closed downstream end 40 and an open annular upstream end 42. The upstream end 42 is connected to the continuous rim 44 defined by the annular flange 34. The centerbody cavity 26 extends within the outer walls 30,38 of the centerbody 20 between the turbine section 18 (see FIG. 1) at the upstream end thereof and the closed downstream end 40. The cavity 26 usually contains the rearmost bearing housing of the engine as well as the oil supply for these bearings (not shown). These components require ventilation in order to prevent damage that could be caused by excess heat, as well as to reduce a risk of fire.

The forward portion 22 of the centerbody 20 is supported and retained in place within the surrounding exhaust duct casing 13 by the plurality of support struts 11 radially extending between the outer wall 30 of the centerbody's forward portion 22 and the exhaust duct casing 13. The struts 11 are hollow and define an air flow passage therethrough, such that fluid flow communication between the centerbody cavity 26 and a source of cooling and/or ventilation air is provided. This ventilation airflow may be either bypass duct air or compressed air from the engine, for example. Accordingly, as shown by the air-flow arrows in FIG. 2, ventilation air is permitted to flow through the hollow struts 11 and into the cavity 26 within the centerbody 20, such as to provide a ventilation and cooling airflow to the centerbody cavity 26. This ventilation air therefore flows from the source of the cooling/ventilation air through the hollow struts 11 and into the cavity 26, before being ejected out into the main exhaust gas flow stream via a plurality of ventilation openings 50, as described further below.

Figure 3:
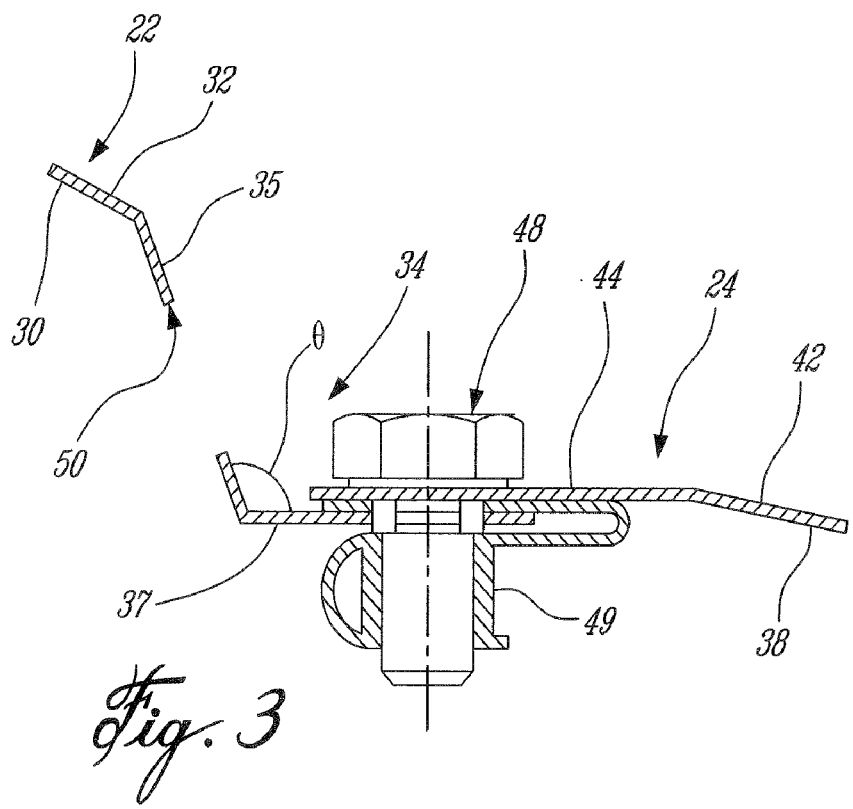
FIG. 3 is a detailed cross-sectional view of detail region 3 in FIG. 2.
Figure 4:
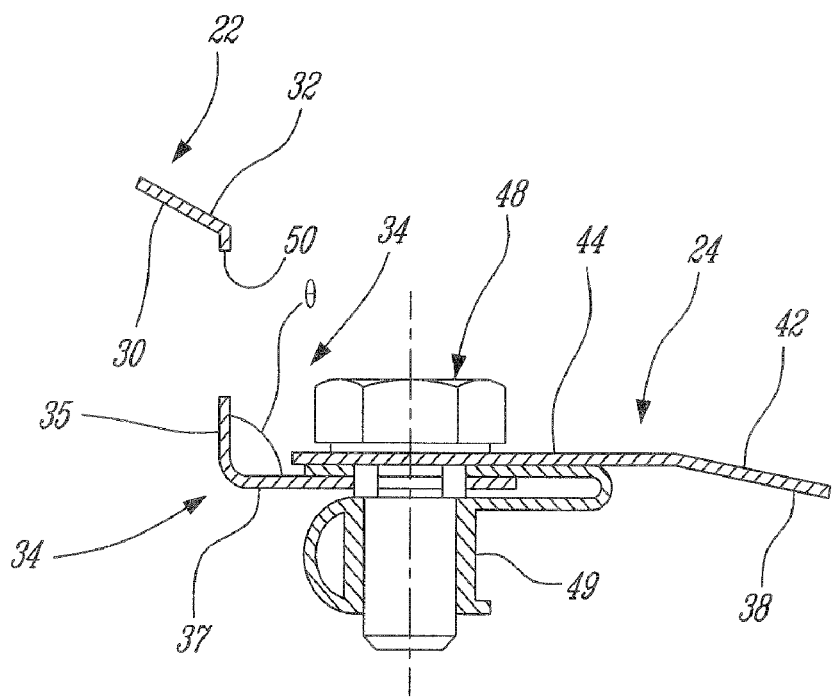
FIG. 4 is a view, similar to FIG. 3, of another embodiment of the present invention.

Referring now to FIGS. 3 and 4, the engagement between the upstream portion 22 and the tailcone portion 24 of the centerbody 20 is shown in greater detail. The forward centerbody portion 22 converges towards its own downstream end 32 that includes the annular flange 34, which itself comprises a first wall portion 35 and a second wall portion 37 downstream thereof. The second wall portion is, in at least the depicted embodiment, substantially parallel to the central longitudinal axis 9 of the centerbody (see FIG. 2), and therefore also to the central longitudinal engine centerline axis C (see FIG. 1). The first wall portion 35 is therefore disposed between the second wall portion 37 and the outer wall 30 of the centerbody's upstream portion 22. The first wall portion 35 is also inclined relative to each of these, being disposed at an angle relative to the second wall portion 37 (and therefore also at an angle relative to the central axis 9 of the centerbody 20). In the embodiment depicted in FIG. 3, the first wall portion 35 is oriented at an obtuse angle relative to the second wall portion 37, i.e. the external angle θ therebetween is between about 90 degrees and about 180 degrees. In the embodiment of FIG. 4, the first wall portion 35 is oriented approximately perpendicularly (i.e. about 90 degrees) to the second wall portion 37. Therefore, the external angle between the first wall portion 35 and the second wall portion 37 is at least 90 degrees (i.e. greater than or equal to approximately 90 degrees).

The second wall portion 37 of the annular flange 34 is matingly engaged to the upstream end 42, and more particularly to the continuous and axisymmetric rim 44 thereof, of the tailcone portion 24. The second wall portion 37 is similarly axisymmetric and concentric with the rim 44, such that they can be mated together. The rim 44 of the tailcone 24 is preferably substantially parallel to the central axis 9 of the centerbody, and as such is also parallel to the second wall portion 37 about the entire circumference thereof. The rim 44 has an internal diameter that is slightly larger than an outer diameter of the second wall portion 37 of the annular flange 34, and as such the rim 44 overlaps at least a portion of the second wall portion 37 such that they can be fastened together. An alternate arrangement (i.e. wherein the rim has a smaller diameter than the second wall portion, for example) is of course also possible. In the embodiment depicted, the second wall portion 37 of the upstream portion 22 and the rim 44 of the tailcone portion 24 are fastened together by a plurality of fasteners 48. These fasteners 48 may be removable, such as the bolts depicted for example, or alternately may be permanently fastened once engaged in place, such as rivets, for example. The bolts 48 as shown pass through correspondingly sized and aligned fastening holes in both the second wall portion 37 and the rim 44, and are fastened in place using either individual lock nuts 49 or a ring having a plurality of the corresponding threaded holes therein. Other means for fastening the two annular portions together may also be used, such as by welding, brazing, bonding, and the like. The fasteners 48 are preferably evenly spaced about the entire circumference of the annular flange 34.

Figure 5:
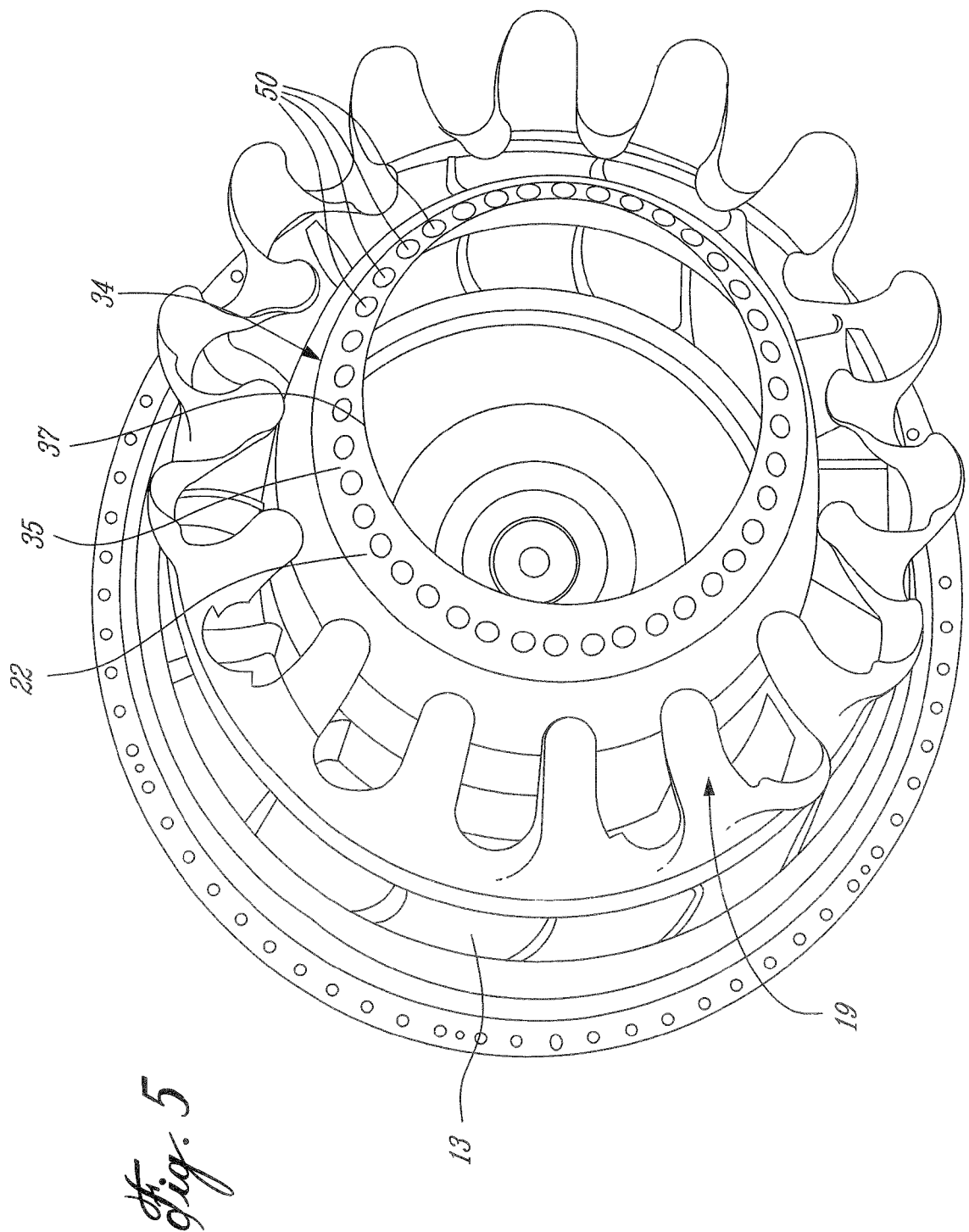
FIG. 5 is a rear perspective view of the exhaust duct inner shroud of FIG. 2, shown with the exhaust centerbody removed.

The angled first wall portion 35 of the annular flange 34 defines therein a plurality of individual openings or holes 50 therein, about the entire circumference thereof. The openings 50, which are disposed in the step change defined by the annular flange 34 of the forward centerbody portion 32, act as ventilation openings, and provide fluid flow communication between the centerbody cavity 26 and the exhaust gas flow surrounding the centerbody 20. Thus, the plurality of ventilation openings 50 permit the centerbody cavity 26 to be ventilated such that cooling/ventilation air within the cavity 26 is free to exhaust out of the centerbody and into the exhaust gas flow. As the first wall portion 35 is angled relative to the upstream and downstream outer walls 32 and 38, no overlap between these main outer walls 32, 38 exits at the joint between the forward centerbody portion 32 and the tailcone portion 24. As the openings 50 are all located within the first wall portion 35, the lack of overlap covering the exit of the openings enable reduced obstructions to air flowing out of the openings. The first wall portion 35 having the openings 50 therein is located downstream relative to an end of the lobes of the exhaust mixer 19. As best seen in FIG. 5, the plurality of openings 50 are, in at least one embodiment, each substantially circular (i.e. are said to be "bullet holes") and have diameter sufficient to extend over a majority of the length of the first wall portion 35. Although the exact direction of airflow out of the openings 50 will vary depending on several factors including the angle of the first wall portion 35, the direction of airflow within the cavity 26, etc., the ventilation air which exits the openings 50 is intended to have negligible aerodynamically negative effects on the exhaust gas flow and therefore on the overall engine performance. The number of openings 50 will vary depending on the overall diameter of the annular flange 34, however a sufficient number of openings 50 are provided in the first wall portion 35 such that the total surface area of the openings 50 (i.e. the voids) is greater than the remaining surface area of the first wall portion 35. The plurality of openings 50 therefore provide good ventilation of the inner cavity 26 of the exhaust centerbody 20, and the structure and configuration of the annular flange 34, and more specifically the first wall portion 34 thereof in which the openings 50 are located, allows for the exhaust gas flowing over the outer surfaces of the wall of the centerbody to be substantially unaffected by the introduction therein of the exhausted ventilation cooling air from within the cavity 26.

Although in the embodiment described above the centerbody 20 comprises two parts, that is the upstream portion 22 and the tailcone portion 24 which are mated together between the closed end 40 of the tailcone and the open upstream end of the upstream portion 22 at the annular flange 34 therebetween, in another embodiment the centerbody 20 in fact formed of a single piece, wherein the upstream portion 22 and the tailcone portion 24 are integrally formed with each other. As such, the outer wall 30 and 38 of the two portions form the substantially uninterrupted annular centerbody wall that extends between the complete upstream and downstream ends. Thus, the outer walls 30 and 38 of the upstream portion 22 and the tailcone portion 24 similarly form a substantially continuous profile of the centerbody 20, which is only interrupted by the annular flange 34. The annular flange 34, as described above with the plurality of ventilation openings 50 therein, is still disposed within the annular centerbody wall at a point between the upstream end and the closed downstream end thereof.

Regardless of whether the centerbody 20 is formed of a separate forward portion and tailcone portion or these portions are integrally joined, the junction therebetween at the annular flange region 34 is such that the forward portion and the tailcone portion are fastened together at the annular flange without axial overlap, i.e. such that at least the first wall portion 35 is radially uncovered such air flowing through the ventilation openings 50 therein is ejected directly into the exhaust gas flow, without being obstructed or deflected by any object (such as a flap, deflector, protruding portion of the forward centerbody portion, etc.). This permits a smoother transition of the ventilation air as it flows into the main exhaust gas flow about the centerbody.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. An exhaust centerbody of a gas turbine engine disposed within an exhaust duct casing, exhaust gas flow passing through an annular exhaust duct passage defined between the exhaust centerbody and the surrounding exhaust duct casing, the exhaust centerbody comprising:
a forward centerbody portion defining a first outer wall over which exhaust gas flows and having an annular :flange at a downstream end thereof, the annular flange including a first flange portion and a second flange portion downstream of the first flange portion, the second flange portion being substantially parallel to a central axis of the centerbody and the first flange portion being disposed between the first outer wall and the second flange portion at an angle relative to said second flange portion;
a tailcone portion defining a second outer wall, the tailcone portion having a closed downstream end and an open upstream end, said open upstream end of the tailcone portion being mated to the second flange portion of the forward centerbody portion about the circumference of the annular flange thereof;
a centerbody cavity defined within the first and second outer walls and the closed downstream end; and
a plurality of ventilation openings defined in said first flange portion of the forward centerbody portion, said ventilation openings permitting fluid to flow from the centerbody cavity within the exhaust centerbody into the exhaust gas flow outside the centerbody cavity, thereby ventilating the centerbody cavity.

2. The exhaust centerbody as defined in claim 1, wherein the open upstream end of the tailcone portion is a continuous axisymmetric rim.

3. The exhaust centerbody as defined in claim 2, wherein the rim extends in a direction generally parallel to the central axis and to the second flange portion of the forward centerbody portion.

4. The exhaust centerbody as defined in claim 1, wherein the open upstream end of the tailcone portion is fastened to the second flange portion of the forward centerbody portion by a plurality of fasteners disposed about the circumference of the annular flange.

5. The exhaust centerbody as defined in claim 1, wherein the angle of the first flange portion is obtuse.

6. The exhaust centerbody as defined in claim 1, wherein the angle of the first flange portion is at least 90 degrees.

7. The exhaust centerbody as defined in claim 1, wherein each of said plurality of ventilation openings is substantially circular.

8. The exhaust centerbody as defined in claim 1, wherein said plurality of ventilation openings are circumferentially evenly distributed about said first flange portion of the annular flange.

9. The exhaust centerbody as defined in claim 1, wherein the exhaust centerbody is supported within the exhaust duct casing by a series of struts radially extending through said exhaust duct passage between said forward centerbody portion of the exhaust centerbody and the exhaust duct.

10. The exhaust centerbody as defined in claim 9, wherein said struts are hollow and each define an airflow passage therethrough, said airflow passages providing fluid flow communication between the centerbody cavity and a source of ventilation airflow.

11. An exhaust centerbody of a gas turbine engine disposed within an exhaust duct casing of an exhaust system, the centerbody having a central longitudinal axis coincident with that of the gas turbine engine, the centerbody comprising:
an upstream end mounted within the exhaust duct casing of the exhaust system, a closed downstream end. and an annular centerbody wall extending between the upstream and downstream ends, a cavity defined within the centerbody and being in communication with a source of ventilation airflow; and
a plurality of ventilation openings defined in said centerbody wall, said ventilation openings providing fluid flow communication between the cavity and exhaust gas flow of the gas turbine engine, such that ventilating air from within the cavity exits into the exhaust gas flow via said plurality of ventilation openings, said plurality of ventilation openings being circumferentially evenly disposed about the centerbody wall within an annular flange wall thereof, said annular flange wall being located between said upstream end and said closed downstream end and disposed at an obtuse angle relative to the central longitudinal axis of the centerbody.

12. The exhaust centerbody as defined in claim 11, wherein the centerbody wall comprises a first centerbody portion and a second centerbody portion serially connected together.

13. The exhaust centerbody as defined in claim 12, wherein the first and second centerbody portions are mated together proximate said annular flange wall.

14. The exhaust centerbody as defined in claim 13, wherein the first centerbody portion comprises a first wall portion at an upstream end thereof, a second wall portion at a downstream end thereof and a radially extending flange wall between the first and second wall portions, the second wall portion being substantially parallel to the central longitudinal axis of the centerbody and the radially extending flange wall being disposed between the first wall portion and the second wall portion at said obtuse angle.

15. The exhaust centerbody as defined in claim 14, wherein the second centerbody portion has an open upstream end which is mated to the second wall portion about the circumference thereof.

16. The exhaust centerbody as defined in claim 15, wherein the open upstream end of the second centerbody portion is a continuous axisymmetric rim.

17. The exhaust centerbody as defined in claim 16, wherein the rim extends in a direction generally parallel to the central longitudinal axis and to the second wall portion.

18. The exhaust centerbody as defined in claim 13, wherein the first and second centerbody portions are fastened together proximate said radially extending flange wall by a plurality of fasteners disposed about the circumference of the second wall portion.

19. The exhaust centerbody as defined in claim 11, wherein each of said plurality of ventilation openings is substantially circular.

* * * * *